United States Patent [19]

Sumner

[11] Patent Number: 5,476,343

[45] Date of Patent: Dec. 19, 1995

[54] OFFSHORE PIPELINE INSULATED WITH A CEMENTITIOUS COATING

[76] Inventor: Glen R. Sumner, 8306 Leafy La., Houston, Tex. 77055

[21] Appl. No.: 982,955

[22] Filed: Nov. 30, 1992

[51] Int. Cl.⁶ ..................................................... F16L 1/12
[52] U.S. Cl. ............................ 405/157; 405/155; 405/158
[58] Field of Search ................................... 405/155, 157, 405/158, 166; 106/639, 692, 696, 705, 709, 713, 724, 737

[56] References Cited

U.S. PATENT DOCUMENTS

| | | | |
|---|---|---|---|
| 3,782,985 | 1/1974 | Gebhardt | 106/97 |
| 4,384,896 | 5/1983 | Aitcin et al. | 106/288 B |
| 4,449,852 | 5/1984 | Muszynski | 405/166 X |
| 4,504,320 | 3/1985 | Rizer et al. | 106/98 |
| 4,721,410 | 1/1988 | Recalde | 405/166 |
| 4,822,422 | 4/1989 | Suguma | 106/97 |

OTHER PUBLICATIONS

Rhoplex DP–2605 A 100% Acrylic Dry Polymer Cement Modifier, Rohm and Haas 1991.

*Primary Examiner*—David H. Corbin
*Attorney, Agent, or Firm*—Kenneth H. Johnson

[57] ABSTRACT

An improved thermally insulated, impact and abrasion resistant pipeline and an impact resistant, flexible, cementitious material which maintains low thermal conductivity when submerged and which is suitable for insulating underwater pipelines, said material comprising:

hydraulic cement, a closed cell aggregate which exhibits low water absorption under high hydrostatic pressure and a polymeric modifier which increases flexibility and reduces porosity of the cured cementitious material.

21 Claims, 1 Drawing Sheet

OFFSHORE PIPELINE INSULATED WITH A CEMENTITIOUS COATING

BACKGROUND OF THE INVENTION

1. Field of the Invention

This invention relates to insulated pipelines, pipeline insulating materials and particularly to a more cost effective, abrasion resistant, insulated offshore pipeline.

2. Related Art

At low temperatures, the flow through pipelines can be impeded by high viscosity and wax formation in liquid products such as oil, and by hydrate formation in products such as natural gas. These problems can be reduced by using thermally insulated pipelines, but insulated pipelines are expensive on land and even more costly offshore. For offshore pipelines it has usually been more cost effective to reduce the need for insulation by injecting various chemicals into the product. Recently, however, more and more oil and gas is being produced in deeper, colder water, from sub-sea production systems where use of viscosity reducing chemicals requires a dedicated line to transport them to the wellhead. This, combined with the fact that the cost of insulating pipelines typically increases with depth, means that insulated pipelines are most expensive where the alternatives are least attractive.

Various materials have been used to insulate land pipelines, including expanded cork, polymer foams, calcium silicate and others. Insulating pipelines offshore is somewhat more complicated because most insulating materials derive their low conductivity from voids which can become saturated in water. Some insulating materials incorporate watertight closed cell structures, but all have some depth limit at which the cellular structure will collapse, and most will fail in a few hundred feet of water. Furthermore, most common insulating materials have little resistance to impact, abrasion or crushing, and must therefore be encased. If the water depth exceeds the hydrostatic pressure limitations of the material then the casing must also isolate the insulating material from the hydrostatic head of the water.

If the pipeline is laid in sections it is a practical necessity to prefabricate each individual pipe section as an independent pressure vessel. Because pressure resistant double pipes are too stiff to spool, several reel laid pipelines have been installed with flexible coatings of solid, elastomers or elastomers filled and extended with other lightweight materials. Examples include neoprene and EPDM rubber, EPDM and polyurethane elastomers filled with glass micro-spheres, and ebonite filled with cork. Unless the insulation requirement is minimal, the total cost of pipelines insulated in this manner is even higher than one which uses a pressure resistant casing to protect less expensive insulating materials. These elastomers cost three to four times as much as thermoplastics such as polypropylene, but the demand is such that extrusion equipment that would be needed to apply thermoplastic materials would have to be amortized over relatively few jobs. This might well outweigh the cost benefit of the material. Another disadvantage of plastics and elastomers is that the operating temperature limits of many are in the range of 190° to 250° F.

The problem of protecting pipeline corrosion coatings against impact and abrasion arises anywhere the pipeline is laid in or towed across rocky terrain. One way to protect corrosion coatings is with a layer of concrete, but this has limited application due to the added weight. On offshore pipelines, concrete is commonly applied to the pipeline to add weight so that it will not float when it is empty. There are two types of equipment in common use for applying concrete to line pipe. One employs what is known as the "impingement method", whereby the wet concrete is sprayed or slung with rotating brushes so that it hits a rotating and axially moving pipe. The other method involves depositing concrete on a wide tape which is being spirally wrapped while rollers outside the tape extrude the concrete to a uniform thickness.

Normal weight concrete is typically not a very good insulator even when dry and worse when saturated. Lightweight concrete mixes are often used for insulation in many applications. Some of these mixes depend on various air entraining chemicals while others incorporate lightweight cellular aggregates. Some of these are closed cell aggregates such as expanded pearlite, but even these closed cell aggregates generally absorb water, and the porosity of the cement binder is considered to be an advantage because it reduces the conductivity. All of these insulating concretes are much more porous than standard weight concrete, and the conductivity goes up exponentially with water absorption. Published data on an expanded shale lightweight concrete with a dry density of approximately 98 lb per cubic foot shows that the conductivity of a saturated sample is nearly three times as high as the same sample after it was oven dried. Furthermore, the amount of material needed to maintain a given temperature drop on an insulated pipeline increases exponentially with the thermal conductivity of the material. Finally, the high hydrostatic pressures in deep water maximize the water absorption a given amount of porosity will allow. Coating these materials does not easily solve this because of the inherent lack of flexibility of most lightweight concrete mixtures. To keep the water out, the coating would have to be able to bridge the cracks that develop while the pipeline is being laid.

U.S. Pat. No. 3,782,985 discloses that hollow, lightweight components of fly ash known as cenospheres can be mixed with hydraulic cements to produce materials with low density, low porosity, low conductivity and high strength. Similar results can be achieved using glass microspheres and certain other closed cell aggregates with high compressive strength.

It is known in the prior art that fumed silica can reduce the porosity and increase strength of concrete. U.S. Pat. No. 4,505,320 discloses that the addition of substantially equal amounts of fumed silica and cenospheres with glass fibers to a hydraulic cement increases compressive and tensile strength. The silica fume does substantially reduce water absorption and the fibers increase tensile strength, but this material would not be normally be suitable as a general purpose insulating material because:

1. Silica fume increases the cost and density. Increasing density leads to a corresponding increase in conductivity under normal conditions.

2. Insulating concretes are normally applied as laminates over more flexible materials, such as steel and are subject to flexing as the substratum expands or bends under load. Silica fume increase tensile and flexural strength but it decreases flexibility, and therefore leads to cracking of the insulation when the substratum bends.

3. Insulating concretes use a higher ratio of porous aggregate to the total mix in order to achieve low conductivity.

Both of the above mentioned patents reveal that the low permeability is achieved despite the fact that the required ratio of water to cement is higher than for normal concrete.

Even with the high water content suggested in these patents, the flowability of the mix is poor. In fact, one reason, if not the primary reason for the high water requirement relates to the flowability of the paste, rather than any reactive requirement. This can be observed by the collection of expelled water on the surface as the material cures. The lack of flowability results from the fact that the weight is too low to overcome its viscosity. If the water content is increased to achieve better flowability, homogeneity of the mix is lost as the light weight cenospheres float to the top. Increasing water content also increases shrinkage that results in cracking when the material is cured on a pipe.

Among other things, the present composition differs from those described in U.S. Pat. Nos. 3,782,985 and 4,505,320, with the addition of polymeric modifiers or substitution of polymeric modifier for some or all of the silica fume to the material described in U.S. Pat. No. 4,505,320.

When fumed silica is added in high concentrations of 15 to 35 percent of the weight of cement, the porosity of the solidified mass becomes very low, but fine discontinuous "micro-cracking" occurs throughout the solidified material. That these micro-cracks can become the predominate factor in water absorption can be clearly observed with the naked eye after the cured material has been submerged for a short time. Cracks that were hardly visible when dry become clearly visible while the water beads on the surface. It has been suggested that micro-cracking may result from the fact that the porosity of the cement matrix is so low that cracks form during the expulsion of excess water. Whether or not this hypothesis fully explains the phenomenon, it is supported by the fact that the cracks are smaller and fewer when less water is used in the mix. Inclusion of fibers reduce microcracking.

SUMMARY OF THE INVENTION

This invention is directed to a cementitious composition, a cost effective insulated pipeline, and an insulated laminate composition comprising a suitable substrate to which said cementitious composition is cured or bonded. Such compositions exhibit greater flexibility than either of the two similar compositions previously disclosed, and they exhibit low conductivity. The resultant composition is cost effective as a pipeline coating which maintains a low thermal conductivity when submerged in water and does not crack when the pipeline bends during the lay process. Additionally, the coating results in a high impact and abrasion resistant jacket. The insulating material comprises three essential components: (1) a hydraulic cement; (2) a polymeric modifier which increases flexibility of the cured composition; and (3) a closed cell, pressure resistant aggregate. Preferably the cement composition is comprised of:

(a) 40 to 55 weight percent of a binder component having a total of 4 to 5 parts by weight comprising;
 (1) 30 parts by weight of type III portland cement;
 (2) 0 to 9 parts by weight of silica fume; and
 (3) 0.1 to 1 part by weight polymeric modifiers; and
(b) 40 to 22 weight percent fly ash cenospheres;
(c) 1 to 2 weight percent super plasticizer; and
(d) water In addition the composition preferably contains reinforcing fibers to further increase flexibility.

DETAILED DESCRIPTION OF THE PREFERRED EMBODIMENTS

Figure 1:
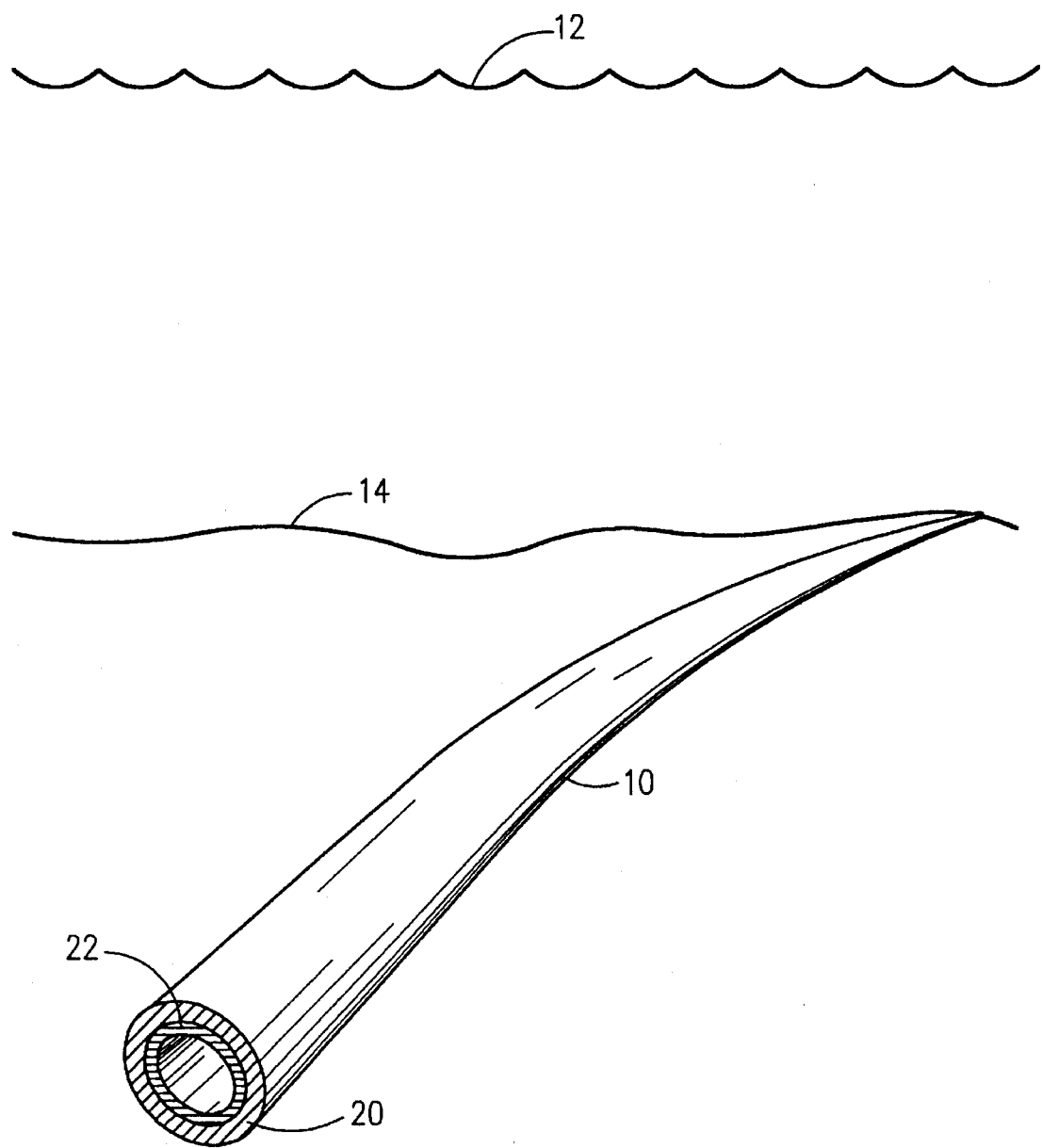
FIG. 1 is a pipeline lying on a marine floor, the end of which is shown as a cross section.

The present invention is directed to a cost effective insulated offshore pipeline and a lightweight, high strength, material which is flexible enough that it will not crack during normal pipe lay operations, has a low thermal conductivity when submerged in water and is thus useful for insulating under water pipelines.

Ingredients

Various agents that have been shown to reduce water absorption in concrete include water repellents such as calcium stearate, fine pozzolans such as fumed silica, and a variety of vinyl latex polymers and epoxys. Vinyl polymeric modifiers include butadiene rubber, styrene/butadiene copolymer and the vinyl acrylics, including vinyl acetate/ethylene copolymer, vinyl acetate/vinyl versatate copolymer and ethylene vinyl acetates. The prior art discloses the inclusion of silica fume to a mixture of hydraulic cement and fly ash cenospheres, however the prior art does not show the use of polymeric modifiers. Adding these polymeric materials to a mixture of cenospheres and cement can substantially increase flexibility of the cured product. These polymers can also reduce water absorption or the binder. When the compound of this invention was initially formulated, it was expected that an important, if not essential part of maintaining low conductivity at depth was to maintaining low water absorption of the cement binder at high hydrostatic pressures. Tests showed, however, that while oven dried samples absorbed water equal to twenty to thirty percent of their initial weight when exposed to high hydrostatic pressure, the thermal conductivity changed surprisingly little. This behavior represents a distinct departure from that of conventional light weight concrete, and it is believed possible that others may have rejected the use of microspheres in cement for insulating pipelines, based on tests for water absorption without actually measuring thermal conductivity. There is, however, a very plausible way to explain how changes in thermal conductivity can be much lower than the change in weight due to water absorption in the compositions of the present invention. In most light weight concrete, even those with closed cell aggregates, both the aggregate and the cement binder are porous. Water absorption therefore affects the binder as well as the aggregate. Cenospheres, however, absorb very little water until they break. It is theorized that while the conductivity of the binder changes substantially, the conductivity of the cenospheres does not. Conventional analytical methods show that the conductivity of several layers of different materials is:

$$K(1+2)=T/(t_1/k_1+t_2/k_2),$$

where K and T are, respectively, the effective overall conductivity and thickness of the laminate, and k and t are the thickness' conductivities of layers, 1 and 2. If similar mathematics can be applied to the composition of this invention based on the relative volumes of binder and cenospheres, rather than thickness, then this becomes:

$$R(1+2)=v_1/k_1+v_2/K_2,$$

where v is the volume of the binder and the cenospheres. If the cenospheres make up a substantial part of the volume and the conductivity of the cenospheres is substantially greater than the conductivity of the binder, then a large change in the conductivity of the binder would have only a small change on the overall thermal resistance. If, for example, the conductivity of the binder is 0.4 when dry and 1.0 when saturated, and the cenospheres with a conductivity of 0.04, make up 40% of the total volume, then the thermal conductivity would be 0.086 dry and 0.94 saturated. Or, according to this theory, the thermal conductivity of the composition may be small even with large percent changes in the conductivity of the binder. In fact, some of the experiments that were done relative to this invention showed variations which were small enough to indicate that the polymers and silica fume were minimizing the variations in the binder as well. It is thought, therefore, that the high measured water absorption was partly due to the filling of relatively large voids which resulted from foam or air entrapped during mixing or due to incomplete mixing, rather than porosity due to entrained air on a micro scale.

In addition to the main benefit of producing a marked improvement in flexibility, the polymeric modifiers and silica fume do, therefore, appear to contribute to lowering the conductivity. Where polymers are used, there may be an additional lowering of the wet or dry conductivity which derives from the fact that the polymer itself has lower conductivity than the hydraulic cement itself. For any volume of uniformly sized spheres the theoretical minimum packing density is determined by the ratio of the volume of a sphere to the volume of a cube with sides of the same dimension as the diameter of the sphere. For mixtures of various sizes of spheres, the determination of theoretical minimum density is more complicated, but in any event, the minimum ratio of spheres to binder is theoretically limited. This theoretical minimum ratio of cement to binder is, however, never achieved and the more important ratio is that which is practical to achieve using the mixing techniques available. This is complicated by the fact that very aggressive mixing can break glass microspheres or cenospheres. There is a practical limit to the ratio of microspheres to cement, beyond which any benefit is lost due to increased water absorption. This limit, however, is a volumetric limit, not a weight limit, and it is thought that the addition of polymers to the mix can produce in a binder which has a lower density, a correspondingly lower conductivity when dry and when submerged.

Similar increases in flexibility may be obtained by adding low molecular weight wax or thermoplastic materials into a mixture of cenospheres and hydraulic cement, followed by heating during or after cure. Such compositions show very low water absorption under dry conditions. Before these experiments were performed it was expected that some reduction in porosity might be achieved due to the capillary dispersion of the thermoplastic in the cured cement matrix, but since the melting of wax or thermoplastic does not permanently increase the volume, it was expected that some permeability would remain. In fact, at low hydrostatic pressure, the water absorption of a such a mixture that comprised no other water repellents or porosity reducing agents was much lower than could be obtained by using latex polymers and the resulting compound exhibits good flexibility. It is believed that the very low water absorption results because the dispersion of thermoplastic in the matrix seals the path of water ingress into the remaining voids and may have some benefit in lowering the overall thermal conductivity when submerged. The preferred additive, or combination of additives, depends on the particular application. In general, thermoplastics are less expensive than latex cement modifiers, but this must be weighed against the cost of heating the material.

Closed cell, pressure resistant fillers which are suitable for use in the insulating materials include fly ash cenospheres, glass microspheres and certain other closed cell aggregates.

In addition to the essential components a "super plasticizer" may be used to make the final mixture more fluid and to permit better wetting and mixing with less water. Super plasticizers are sometimes used to reduce the water requirements of cement mixes and are commonly available. It is believed that the active ingredient in some of these is the sodium salt of formaldehyde condensate of naphthalene beta-sulfonic acid.

Water repellents, such as calcium stearate, may also be included.

Finally, fibers may, and preferably would be included to further reduce cracking and increase flexibility. Typically these will be polyethylene, polypropylene or polyester fibers, used in amounts of from about 1 to 5 weight percent of the total composition.

Preparation and Composition

Typically the mix is prepared by blending the dry components and the liquid components separately. Latex admixtures may be furnished as dry or liquid mixtures. The powdered materials are then added gradually during gentle blending of dry and liquid components. This method minimizes breakage of the cenospheres due to mixing. Breaking of the cenospheres can also be minimized by gently blending them into the other components after these other components have been thoroughly mixed. Table I below presents a typical insulating material according to the present invention.

TABLE I

| Compound | Parts by Wt. |
| --- | --- |
| Type III Portland Cement | 34 |
| Silica Fume | 7 |
| Styrene/Butadiene Rubber | 6 |
| Anti Foaming Agent | 0.5 |
| Cenospheres | 28 |
| Polypropylene Fibers | 2 |
| Super Plasticizer | 1.5 |
| Water | 21 |
| | 100 |

The compositions may be applied to pipes (or other substrata) by the impingement method, i.e. by spraying on the pipe, by the tape extrusion method or by extruding or casting elongated ring segments and bonding or fastening these segments to the pipe. The viscosity of the composition shown above might not be low enough for casting. Therefore, the application of the coating by the other methods allows the use of very light weight mixes without the problems non-homogeneity that could result if the water content were high enough to produce castable materials.

The thickness of the coating will depend on the temperature of the sea water, the pipe dimensions, other coatings that may be present, the temperature, pressure and properties of the material to be transported and the conductivity of the specific cured composition.

Referring to FIG. 1 a pipeline 10 is shown on the marine floor 14 where 12 is the water level. The pipeline is coated with a cementitious covering 20, around the pipe 22. The pipe being a suitable substrate for the cementitious coating.

The invention claimed is:

1. An insulated under water pipeline comprising in combination:

(a) continuous section of pipe; and (b) an insulation mixture comprising:

(i) 40 to 55 weight percent of a binder component comprising;

(1) 30 parts by weight of hydraulic cement;

(2) 0 to 9 parts by weight of silica fume; and
(3) 0.1 to 1 parts by weight polymeric modifier; and
(ii) 40 to 25 weight percent fly ash cenospheres, glass microspheres or a combination of the two; and
(iii) water in sufficient quantity to achieve the desired consistency, normally 19 to 23 percent;

said insulation mixture exhibiting flexibility, high impact and abrasion resistance, and low thermal conductivity when submerged, which is applied to the outer surface of said pipe to a thickness necessary to provide physical strength and thermal insulation and cured or otherwise affixed thereon.

2. The insulated under water pipeline according to claim 1 wherein said polymeric modifier comprises a polyacrylate, butadiene, styrene/butadiene latex or epoxy.

3. The insulated under water pipeline according to claim 1 wherein some or all of said polymeric modifier is a wax or thermoplastic material, and which during or after curing, said composition is heated to a temperature above the melting point of the wax or thermoplastic material and held at that temperature long enough for the polymer to melt and disperse into the voids and cracks.

4. The insulated under water pipeline according to claim 1, wherein the hydraulic cement is portland cement, high alumina cement or a combination of portland cement and high alumina cement.

5. The insulated under water pipeline according to claim 1 wherein fibers are dispersed.

6. The insulated under water pipeline according to claim 1 wherein water repellents are added.

7. The insulated under water pipeline according to claim 2, wherein the hydraulic cement is portland cement, high alumina cement or a combination of portland cement and high alumina cement.

8. The insulated under water pipeline according to claim 3, wherein the hydraulic cement is portland cement, high alumina cement or a combination of portland cement and high alumina cement.

9. the insulated under water pipeline according to claim 2 wherein fibers are dispersed.

10. The insulated under water pipeline according to claim 3 wherein fibers are dispersed.

11. The insulated under water pipeline according to claim 8 additionally containing 1 to 2 weight percent super plasticizer.

12. The pipeline according to claim 1 wherein said closed cell aggregate comprises fly ash cenospheres.

13. The pipeline according to claim 1 wherein said closed cell aggregate comprises glass microspheres.

14. The insulated under water pipeline according to claim 2 wherein said polymeric modifier comprises a polyacrylate.

15. The insulated under water pipeline according to claim 2 wherein said polymeric modifier comprises butadiene, styrene/butadiene latex.

16. The insulated under water pipeline according to claim 2 wherein said polymeric modifier comprises epoxy.

17. The insulated under water pipeline according to claim 3 wherein some or all of said polymeric modifier is a wax.

18. The insulated under water pipeline according to claim 16 wherein some or all of said polymeric modifier is a thermoplastic material.

19. The insulated under water pipeline according to claim 1 wherein fly ash cenospheres are present.

20. The insulated under water pipeline according to claim 1 wherein glass microspheres are present.

21. The insulated under water pipeline according to claim 1 wherein fly ash cenospheres and glass microspheres are present.

* * * * *